United States Patent Office 2,875,071
Patented Feb. 24, 1959

2,875,071
PRESERVATION OF COLOR IN GREEN VEGETABLES

George J. Malecki, Le Sueur, Minn., assignor to Patent Protection Corporation, New York, N. Y., a corporation of New York, trustee No Drawing. Application May 18, 1955
Serial No. 509,405

5 Claims. (Cl. 99—186)

This invention relates to improvements in preservation of color in green vegetables and has for its object to provide a method whereby the composition of the can contents will be maintained at the same pH level for prolonged periods notwithstanding the change which takes place in the canned vegetables during storage. It is well known that the change in color of green vegetables during the canning process is due to the breakdown of the chlorophyll. It is also known that such color change can be largely prevented by employing an alkaline canning solution such that the alkalinity of the canning solution at the conclusion of the canning process is approximately 8.0–8.5 pH. Considerable effort has been directed toward the development of canning solutions having an alkalinity of this order which will not adversely affect the taste or texture of the canned product.

It has been noted, however, that vegetables so processed will still have their natural green color if consumed within a short period after canning, while identically prepared cans, if maintained in storage for a period of months, will develop the greenish yellow appearance of vegetables canned in the usual sugar-salt canning solution which is substantially neutral at the conclusion of the canning process. This change in color is due to a progressive change in alkalinity during storage for I have noted that a canning solution which had a pH of 8.0–8.5 at the conclusion of the canning process will, after eight or ten months' storage at ordinary warehouse temperatures, have a pH in the order of 7.0–7.5, with changes of lesser magnitude after shorter periods of storage under like conditions.

I have discovered that the alkalinity of the canning solution may be maintained within the range required to preserve the green color by providing the can with a lining of suitable material having alkaline compounds incorporated therein in such manner that the compounds will leach out of the lining slowly over a period of months.

The following are specific examples of preferred procedures for carrying out my invention.

Example I

A solution of ethyl cellulose is prepared by adding to ethyl acetate 5% by weight of a suitable alkaline compound, for example, magnesium hydroxide ($Mg(OH)_2$) and 5% by weight of ethyl cellulose. A suitable grade of ethyl cellulose is the product marketed as Type G by the Hercules Powder Co. The interior of the can, preferably after steam sterilizing and drying, is sprayed with the above solution to such extent as necessary to build up a film of 1–2 mils thickness when the solvent has evaporated. In lieu of the ethyl acetate a mixture of 80% toluene and 20% ethanol may be used as the solvent. The film formed as above, described on the inner surface of the can, is sufficiently hydrophilic to slowly absorb the aqueous canning solution, which gradually leaches out the alkali, thereby retarding the change in pH which would otherwise take place.

In lieu of the magnesium hydroxide, other suitable alkaline compounds may be used, for example, disodium glutamate, which is preferably employed alone or in conjunction with magnesium hydroxide to give the desired alkalinity to the canning solution during the canning process. The disodium glutamate may be substituted in whole or in part for the magnesium hydroxide in the coating applied to the walls of the can. Other compounds may be substituted for disodium glutamate as buffers, particularly the sodium salts of certain amino acids and other organic acids, for example, glycene, asparti acid, tyrosene, citric acid and thytic acid are most effective as buffers in the pH range which it is desired to maintain.

Example II

A solution of water soluble resins is prepared by adding to water containing 5% $mg(OH)_2$ or an equivalent amount of a water soluble alkali of the character mentioned above, 4% by weight of a synthetic resin known as Elvanol, a Du Pont product, and 1% of a water soluble alkali catalyzed heat reactive phenolic resin. The interior of the can is coated with the above solution and is baked 30 minutes at 325° F. The coating when dried, should be in the order of 1–1.5 mils in thickness.

Example III

A resin solution is prepared by adding to a solvent consisting of xylene 84.5%, butanol 8.7%, and naphtha 6.8%, a mixture of synthetic resins consisting of 7 parts of an epoxy resin and 3 parts of a melamine-formaldehyde resin. The ratio of resin to solvent should be in the order of 1 to 10. After coating the can with the above solution it should be baked for approximately 30 minutes at 300° F. The coating obtained is hydrophilic to a limited degree. It is also alkali-resistant, that is, it is less absorptive of alkaline solutions than neutral soultions and is hence rendered more absorptive as the alkalinity of the canning solution tends to decrease. The particular resins may be Epox 1007 from the Shell Chemical Company and Melamax 2458 of the American Cyanamid Company. Before applying the coating to the can $Mg(OH)_2$ is added in an amount approximately the same by weight as the added resin. Any alkaline compound suitable for addition to the canning solution may be substituted for the $Mg(OH)_2$.

Example IV

Instead of a resin or plastic coating, as specified above, a suitable coating may be prepared from soy bean oil which is entirely innocuous as an additive to the canned product. Soy bean oil is air blown at 100° C. to a viscosity of E measured on a Gardner-Holdt tube, and a peroxide value of 334. The soy bean oil is rendered alkali-resistant by styrenation. This is accomplished by adding to 58 parts of the blown soy bean oil, 29.4 parts of styrene and 12.6 parts of methyl styrene. The mixture is heated at 122° C. for a two-hour period and allowed to stand for 8 hours. There is then added to 325 parts of the styrenated blown soy bean oil 57.6 parts of glycerol and one part lime. This is heated at 230° C. for about one hour. There is then added phthalic anhydride 120 parts and xylene 20 parts. This is then heated for about 3½ hours at 230° C. and thinned with xylene to the desired viscosity for application to the cans after the addition of the necessary amount of the alkaline salt, to leave in the film formed on the evaporation of the solvent a quantity of compound in the same order as obtained in the foregoing examples. The baking schedule is preferably 45 minutes at 300° C.

The amount of solvent added is, of course, not critical and depends upon the method used for coating cans.

If the layers are built up by repeated spraying and alternate drying a greater amount of solvent will be used than when the coating is applied in one operation.

Example V

An alkali-resistant phenolic resin is produced by adding to 100 pounds Bakelite 12.5 gallons tung oil. The mixture is heated at 450° for 30 minutes and is then thinned by the addition of 27½ gallons of xylol. To this is added 100 pounds of a mixture of alkaline compounds, for example, magnesium hydroxide 70 pounds, magnesium ascorbate 30 pounds. Xylol is then added to give the desired fluidity for the coating operation. Baking schedule 30 minutes at 325° F.

Example VI

A phenol formaldehyde resin of the thermosetting type and 30%–50% of magnesium hydroxide are mixed in. The surface of the can is then enameled with this foam-resin and then baked, preferably for 30 minutes at 325° F. An equivalent amount of a suitable alkali compound such as hereinafter mentioned may be used and the foam-resin coating may be applied over a lining of impervious resin if desired to prevent contact of the contents of the metal of the can. The foam-resin on setting is microporous and the alkaline compound will slowly leach out of the pores of the resin and maintain the pH of the canning solution within the desired range. The porosity of the foam-resin may be modified by adding with the magnesium hydroxide or other alkaline compound a water soluble substance which is innocuous in the canning solution, for example, lactose. This type of lining depends for its leaching qualities on the passage of the canning solution in contact with the surface to and through successive pores as the storage period continues. By the admixture of the lactose the surface area of the pores for absorption of the liquid is progressively increased as the lactose is dissolved out of the resin. Instead of using a water impervious material for the foam-resin a slightly hydrophilic resin such as above described may be advantageously used.

A microporous resin may also be prepared by adding finely ground porous material such as silica gel, diatomaceous earth and the like to the resin along with the selected alkaline compound.

In the foregoing examples I have referred to magnesium hydroxide as a suitable alkaline compound. Other alkaline compounds may of course be used, for example, calcium hydroxide, sodium carbonate, sodium phosphate, as well as the salts of organic acids mentioned herein.

The above formulas represent coatings suitable for coating the entire inner surface of the can by the machinery and apparatus now in use for coating the inner surfaces of cans with impervious linings to prevent contact of the contents with the metal of the can. Lined cans are used where the commodity packed in the can is adversely affected by reaction with the metal of the can or the can is subject to corrosion by contact with the contents. The coatings heretofore applied are effective for their intended purpose to the extent that they are completely non-reactive and provide a continuous adherent protective coating for the entire surface of the metal. My improved can lining may be applied to cans having such linings where the commodity packaged is adverse-affected by contact with the metal.

It is not necessary that my improved can lining cover the entire surface of the can, but on the contrary, more uniform results will be obtained if the lining is confined to the wall of the can as distinguished from the ends. The quantity of alkali leached out of the lining is dependent on the area of the lining that is in contact with the liquid contents of the can. If the cans are stored with the cases in which they are packed positioned so that the cans are vertical, one end or the other of the can will be out of contact with the canning solution, whereas if the cases are positioned so that the cans are resting on their sides the surface of the can which is not wetted by the canning solution will be greatly reduced. If, however, the alkalized lining is applied only to the surface of the walls of the cans as distinguished from the ends, the wetted surface will be approximately the same regardless of the position in which the cans are stored. Also, of course, the lining need not cover the entire surface of the walls of the can but may be applied in stripes or otherwise in limited areas to thereby reduce the surface of the alkalized resin which is wetted by the canning solution. That is to say, the same quantity of alkalized resin can be applied to thicker films to limited areas of the exposed surface of the cans and thus reduce the rate at which the alkali will be leached out of the applied coating.

Instead of confining the alkalized coatings to a limited area of the canning surface the leaching of the alkali from the coating may be prolonged by applying the alkalized coating to the can and thereafter applying a very thin coating of a non-absorptive, non-hydrophilic resin, such as now employed for protective coatings, over the hydrophilic coating. The film of non-hydrophilic coating can be readily applied by spraying or otherwise in layers thin enough to have a limited porosity, thereby reducing to any desired extent the rate of absorption of the hydrophilic undercoating.

Instead of incorporating the alkaline compounds in the coating material the resinous coating may be applied to the can walls and while still viscous the alkaline compounds may be dusted on the coating or otherwise embedded in the surface of the coating. A thin overlayer of a non-hydrophilic material may then be applied to reduce the rate at which the alkali will be dissolved in the canning solution.

It will be understood that my invention is not limited to any particular alkaline compounds or combination of compounds or to any particular resins or other coating material. It is essential that the selected alkaline compounds and resins be innocuous and of a character not to adversely affect the taste or texture of the canned vegetables. It is also essential that the resin be of a character such that the alkali will slowly dissolve out of the coating in order to prolong the storage period during which the alkalinity of the canning solution will be maintained above the desired minimum without at any time producing a degree of alkalinity which would be unsuitable from the standpoint of taste and texture.

It will be understood, therefore, that my invention is not limited to the specific compositions mentioned but that the same may be variously modified within the scope of the appended claims.

In the foregoing specification and claims the expression "alkaline compound" is used generically to include compounds which when added to the aqueous solution such as the conventional canning solution, will tend to increase the pH of the solution.

I claim:

1. A canned food product consisting of a hermetically sealed metal can containing a green vegetable in an alkaline canning solution, the interior of the surface of the can having a coating consisting of a composition containing an innocuous alkaline compound which is soluble in the canning solution, said coating and compound being of such character that the alkaline compound will progressively dissolve in the canning solution over a prolonged period of time whereby the pH of the canning solution is maintained substantially unchanged for the prolonged period of time.

2. The canned food product of claim 1 wherein the coating composition is slightly hydrophilic.

3. The canned food product of claim 2 wherein the hydrophilic coating composition is covered with a thin film of non-hydrophilic composition.

4. The method of preserving color in canned green vegetables which consists in placing the vegetables in an alkaline canning solution and adding to a portion of the interior surface of the can a coating consisting in part of an innocuous alkaline compound which is soluble in the canning solution, said coating and compound being of such character that the alkaline compound will progressively dissolve in the canning solution over a prolonged period of time to maintain the pH of the solution at a substantially unchanged value for the prolonged period of time.

5. The process of claim 4 wherein the coating composition is slightly hydrophilic.

References Cited in the file of this patent

UNITED STATES PATENTS

| 957,137 | Baekeland | May 3, 1910 |
| 1,966,856 | Groff | July 17, 1934 |
| 2,047,957 | Fletcher | July 21, 1936 |
| 2,067,134 | Zabel | Jan. 5, 1937 |
| 2,133,117 | Schroder | Oct. 11, 1938 |
| 2,189,774 | Blair | Feb. 13, 1940 |
| 2,318,426 | Schroder | May 4, 1943 |
| 2,336,785 | Guernsey | Dec. 14, 1943 |
| 2,473,747 | Giesker | June 21, 1949 |
| 2,589,037 | Bendix | Mar. 11, 1952 |

FOREIGN PATENTS

| 402,877 | Great Britain | Dec. 14, 1933 |

OTHER REFERENCES

"Industrial and Engineering Chemistry," October 1954, pages 2226–2232.